Jan. 19, 1960 F. W. CISLAK 2,921,798
COMBINATION HOUSEHOLD UTILITY IMPLEMENT
Filed July 1, 1958 3 Sheets-Sheet 1
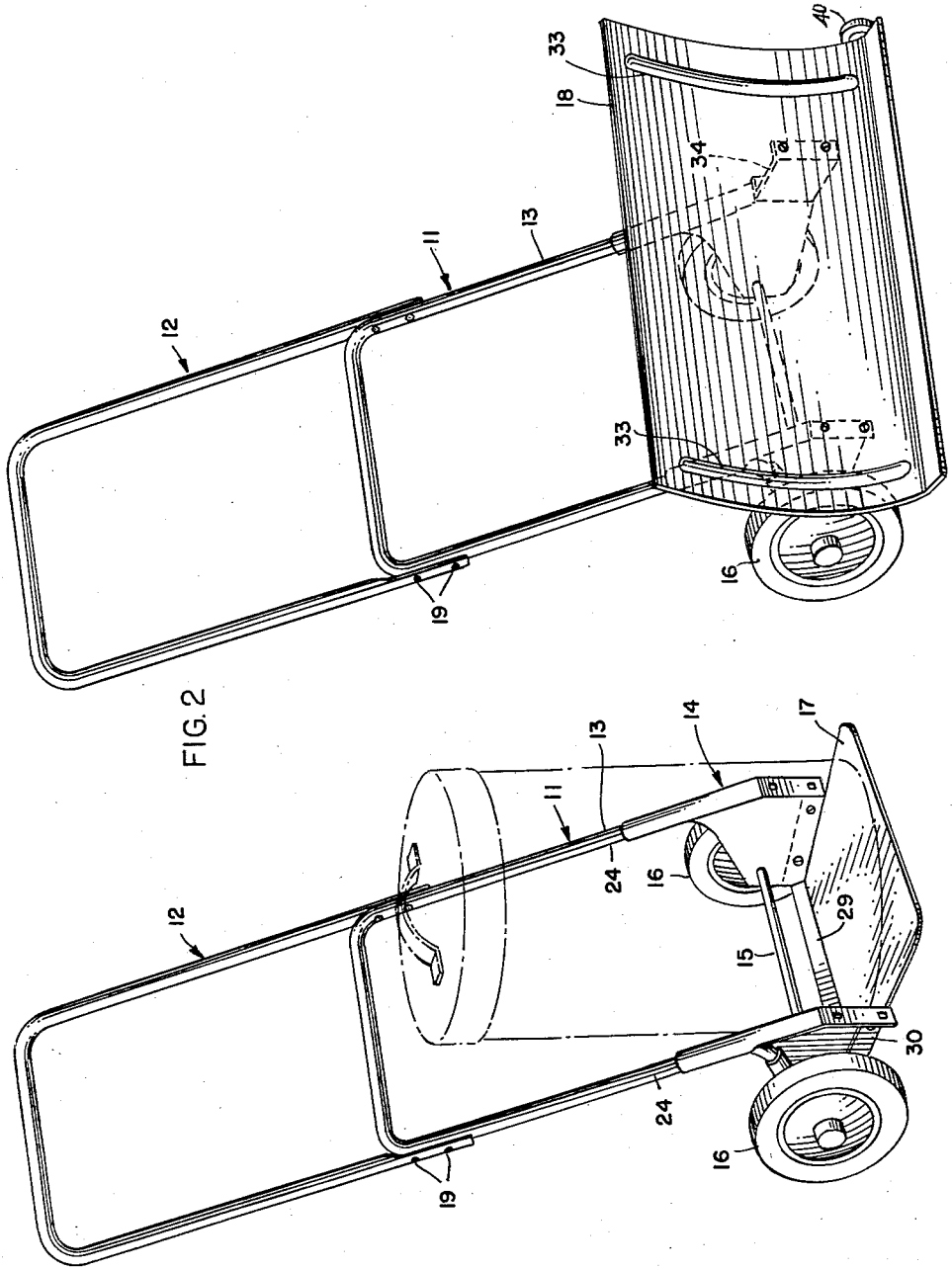
INVENTOR:
FRANK W. CISLAK
BY
ATT'YS Jan. 19, 1960  F. W. CISLAK  2,921,798
COMBINATION HOUSEHOLD UTILITY IMPLEMENT
Filed July 1, 1958  3 Sheets-Sheet 2
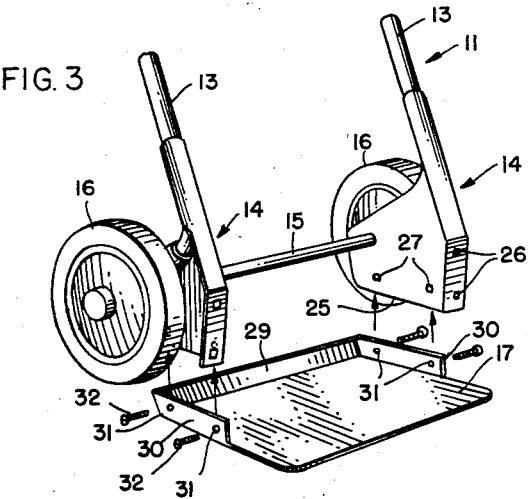
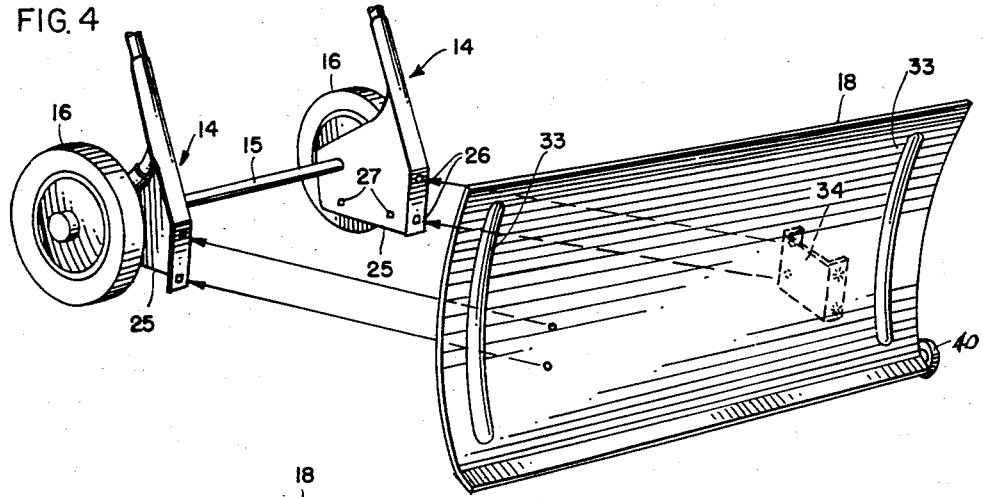
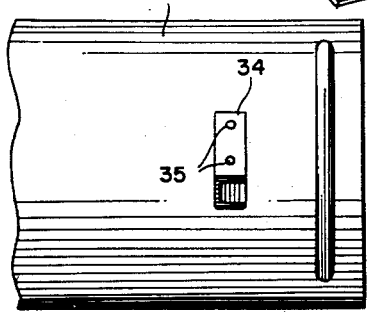
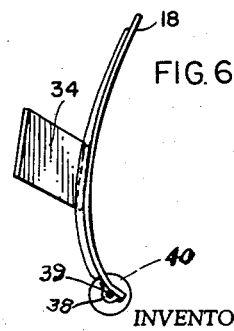
INVENTOR:
FRANK W. CISLAK
BY
ATT'YS

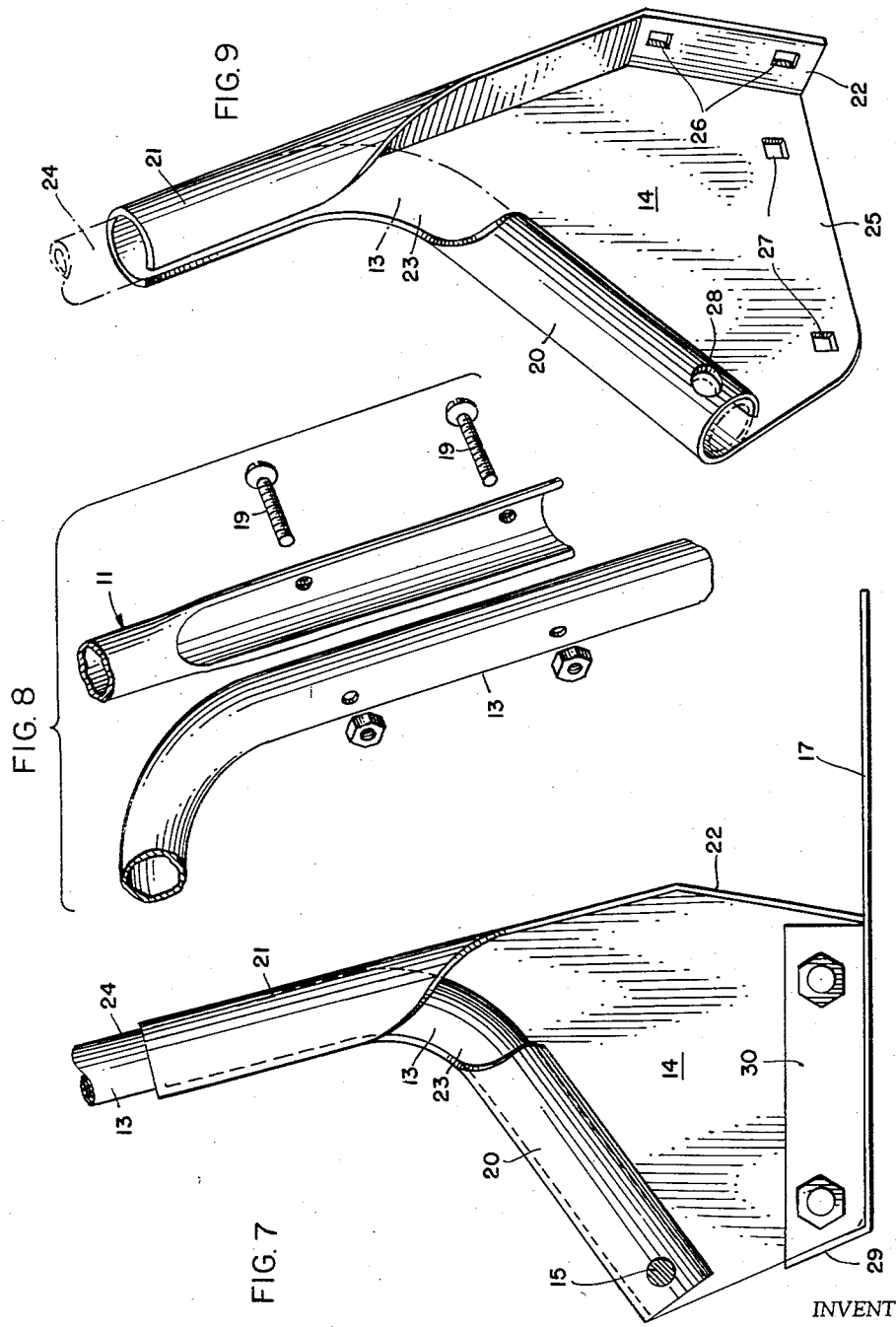

United States Patent Office 2,921,798
Patented Jan. 19, 1960

2,921,798
COMBINATION HOUSEHOLD UTILITY IMPLEMENT

Frank W. Cislak, Oak Lawn, Ill.

Application July 1, 1958, Serial No. 745,878

3 Claims. (Cl. 280—47.27)

This invention relates to a two-wheeled implement having interchangeable accessory panels which make the implement adaptable for different utilitarian functions about the home.

There are two chores which have to be performed about the modern household: the transport of objects too heavy for a person to lift, as for example barrels, boxes, and garbage cans, and the removal of snow from the walks and/or the spreading of sand and dirt. Very often it becomes the task of the women of the household to perform these chores. Concurrently, there is no light-weight, wheeled implement capable of use for both of these types household function.

The main objects of this invention are to provide an improved form of a two-wheeled household implement with interchangeable panels to make the implement suitable for use either for the transport of heavy objects or for the removal of snow, as the owner of the implement may desire; to provide an improved two-piece handle- and wheel-support section easily assembled or disassembled to permit use for either object-transport or snow-removal purposes; and to provide a combination household utility implement of this kind which is simple but rugged in construction, easily assembled for either use, and when dismantled is compactly arranged for shipment and/or storage.

In the adaptation shown in the accompanying drawings,

Figure 1 is a perspective view of an improved implement, constructed in accordance with this invention, being used for transport purpose;

Fig. 2 is a similar perspective view of the implement being used for snow removal;

Fig. 3 is an exploded perspective of the lower end of the support-section and the transport panel;

Fig. 4 is a similar exploded view of the lower end of the support-section and the snow-removal panel;

Fig. 5 is a rear view of the snow panel;

Fig. 6 is a side elevation of the same panel;

Fig. 7 is an enlarged side view of the lower end of the implement;

Fig. 8 is an enlarged detail showing how the two frame sections are detachably secured together; and Fig. 9 is a perspective view of one of the separately-formed brackets which intermediately mount the panels on the frame.

The essential concept of this invention involves a separable, two-section, U-shaped frame to the opposite lower ends of which are affixed flanged brackets mounting a wheel-supporting axle and to which are interchangeably attachable a platform panel, to constitute the implement a lift truck, or a snow-panel to constitute the implement a snow plow and sand or dirt spreader.

A combination household utility implement embodying the foregoing concept comprises a frame 11 formed of a U-shaped handle section 12 and a U-shaped wheel-and-panel support-section 13, to the latter of which is affixed flanged brackets 14 supporting an axle 15 journalling wheels 16 and interchangeably mounting either of two different panels 17 and 18.

The two sections 12 and 13 preferably are steel tubing and detachably secured together in extended relationship by suitable fasteners, such as bolts and nuts 19. As most clearly shown in Fig. 8, the extremities of the parallel sides of the handle-section 12 are flattened and curved to fit over and partially embrace the base ends of the parallel sides of the support-section 13.

The brackets 14, preferably are separately formed, although they possibly might be made integral with the extremities of the parallel sides of the support section 13. As shown in Fig. 9, the brackets 14 are sheet metal stampings shaped from rather irregular-shaped flat pieces of metal to provide each with pairs of yieldable sleeves 20 and 21 and inwardly-disposed angulated flanges 22. The sleeves 20 and 21 (see Figs. 3 and 4) fit over the angulated extremities and the directly adjacent main portions 24, respectively, of the lower ends of the parallel sides of the support section 13. The form and mounting of these brackets 14 on the support section 13 are such that the lower edges 25 are straight and nearly parallel with the floor or ground, when the implement is being used, and the flanges 22 nearly normal to the lower edges 25 of the brackets.

A pair of vertically-spaced apertures 26 are formed in the lower portions of each of the flanges 22 and a pair of horizontally-spaced apertures 27 are formed in each of the brackets adjacently parallel with the lower edges 25.

The brackets 14 are formed first with only the edges bent over to provide the flanges 22. Then, after the ends of the parallel sides of the support section 13 of the frame 11 are angulated (Fig. 7), the peripheral portions of the brackets 14 are bent around the angulated ends and adjacent portions of the section sides (Fig. 9).

The axle 15 is a length of suitable-gage steel rod set in holes 28 in the upper rear corners of the brackets 14. The wheels 16 are journalled on the ends of the axle 15 outwardly of the brackets 14.

The panel 17 is a flat metal plate with rounded forward corners and with the rear edge turned up, to form a flange 29. The rear side portions of the lateral edges are turned up to form flanges 30. The flanges 30 are spaced apart a distance which permits them to embrace and abut the outer faces of the respective brackets 14, when the panel is to be attached to these brackets. Also, the forward ends of the flanges 30 generally fit against the rear faces of the flanges 22 so as to insure greater rigidity of the mounting of the panel 17 on the frame 11. Apertures 31 are formed in the side flanges 30 to register with the apertures 27 in the respective brackets 14. Fastener means 32, usually in the nature of bolts and nuts, inserted through the registering apertures 27 and 31 firmly secure the panel 17 in place with the major portion of the panel 17 extending forwardly of the brackets 14.

With the panel 17 so secured to the brackets 14, as shown in Fig. 1, the implement serves as a lift truck for transport of boxes, barrels, and cans otherwise too heavy or cumbersome for carrying by an individual.

The panel 18 preferably is a curved metal plate of slightly elongated rectangular shape with transverse reinforcing ribs 33 formed adjacently parallel to the ends. Although the panel 18 might be directly attached to the brackets 14, it is preferred to mount the panel 18 on the brackets 14 by intermediate brackets 34. As best shown in Figs. 5 and 6, these intermediate brackets are of U-shape. One leg is bonded to the back of the panel 18, adjacent each end and intermediate the lateral edges of the panel 18. The other leg of each intermediate bracket 34 has apertures 35 to register with the apertures 26 in the flanges 22.

In the lower right hand corner of the panel 18, as viewed in Figs. 2 and 4, I provide a bearing 38, having an axle 39 extending laterally away from the edge of the panel 18, on which a small wheel 40 is mounted for easy and ready movement of the panel 18 when in use.

With the panel 18 secured to the brackets 14, as shown in Fig. 2, the implement serves as a plow for removing snow or spreading gravel, sand and/or dirt, as the occasion may require.

As is quite apparent, either one or the other of the panels 17 or 18 may very easily be attached to the brackets 14 so that the one wheeled frame 11 serves to make the implement useful for either of two entirely different household functions.

With both panels 17 and 18 removed and the two sections 12 and 13 of the frame 11 disconnected, the several parts may be compactly placed in a single, comparatively-small carton for storage or transport.

Although but one specific embodiment of this invention is herein shown and described it will be understood that details of the construction shown may be altered or omitted without departing from the spirit of the invention as defined by the following claims.

I claim:

1. A household utility implement of the class described comprising, an inverted U-shaped tubular frame having short portions adjacent the ends of the parallel sides disposed at obtuse angles to the respective axes of the parallel sides, a pair of polygonal-shaped flat brackets each having the perimetrical portions along the two adjacent angled edges turned in upon the face of the bracket to form tubular sockets disposed at angles the same as the angulation of the short end portions and parallel frame sides, the sockets telescopically embracing the respective adjacent angled frame ends and sides and anchoring the brackets dependent from the angled frame ends, a flat right-angled flange along the adjacent edges of each bracket below the tubular socket which embraces the frame above the respective angled ends, the flanges and the flat part of each bracket adjacent the edge opposed to the sockets having apertures for the insertion of removable fasteners for securing to the brackets one or another of two panels, and an axle spanning the brackets and extending through holes in the extremities of the angled frame ends and mounting wheels.

2. A household utility implement of the class described comprising, an inverted U-shaped tubular frame having short portions adjacent the ends of the parallel sides disposed at obtuse angles to the respective axes of the parallel sides, a pair of polygonal-shaped flat brackets each with an extension disposed outwardly from one corner of the main part with one edge of the extension disposed at an obtuse angle to the adjacent edge of the main part, each bracket having the extension and the perimetrical portion along the adjacent edge turned in to form tubular sockets disposed at angles the same as the angulation of the short end portions and parallel frame sides, the sockets telescopically embracing the respective adjacent angled frame sides and ends and anchoring the brackets dependent from the angled frame ends, a flat right-angled flange along the adjacent edges of each bracket below the tubular socket which embraces the frame above the respective angled ends, the flanges and the flat part of each bracket adjacent the edge opposed to the sockets having apertures for the insertion of removable fasteners for securing to the brackets one or another of two panels, and an axle spanning the brackets and extending through holes in the extremities of the angled frame ends and mounting wheels.

3. A household utility implement of the class described comprising, a frame composed of an inverted U-shaped support section and an inverted U-shaped handle section, the support section having short portions adjacent the ends of the parallel sides disposed at obtuse angles to the respective axes of the parallel sides, the handle section having the extremities of the parallel sides compressed to arcuate cross section to fit over and secured to the sides of the support section adjacent the transverse base end, a pair of polygonal-shaped flat brackets each having the perimetrical portions along the two adjacent angled edges turned in upon the face of the bracket to form tubular sockets disposed at angles the same as the angulation of the short end portions and parallel support frame sides, the sockets telescopically embracing the respective adjacent angled support-frame ends and sides and anchoring the brackets dependent from the angled support-frame ends, a flat right-angled flange along the adjacent edges of each bracket below the tubular socket which embraces the support frame above the respective angled ends, the flanges and flat part of each bracket adjacent the edge opposed to the sockets having apertures for the insertion of removable fasteners for securing to the brackets one or another of two panels, and an axle spanning the brackets and extending through holes in the extremities of the angled support frame ends and mounting wheels.

References Cited in the file of this patent

UNITED STATES PATENTS

| | | |
|---|---|---|
| 1,814,309 | Gullborg | July 14, 1931 |
| 2,198,918 | Mercil | Apr. 30, 1940 |
| 2,460,560 | Williams | Feb. 1, 1949 |
| 2,508,612 | Kimbler | May 23, 1950 |
| 2,598,952 | Weingart | June 3, 1952 |
| 2,784,505 | Pochopien | Mar. 12, 1957 |